Oct. 17, 1967 B. COOPER 3,348,020
HAND-HELD ELECTRIC HAIR DRYER
Filed Jan. 25, 1965 2 Sheets-Sheet 2
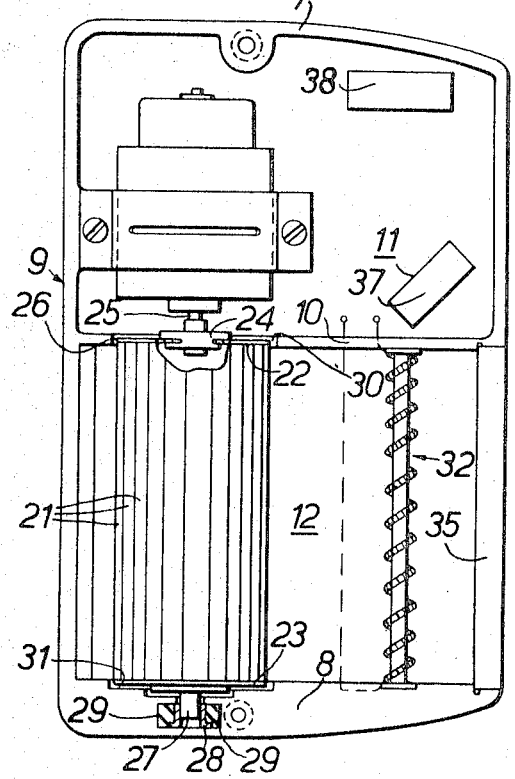
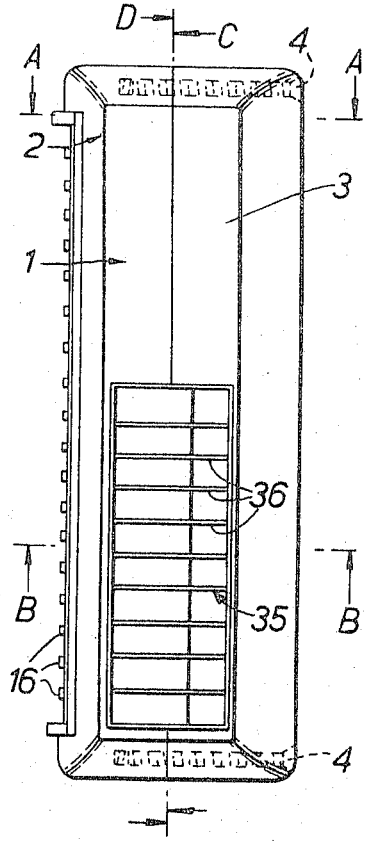
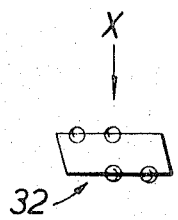
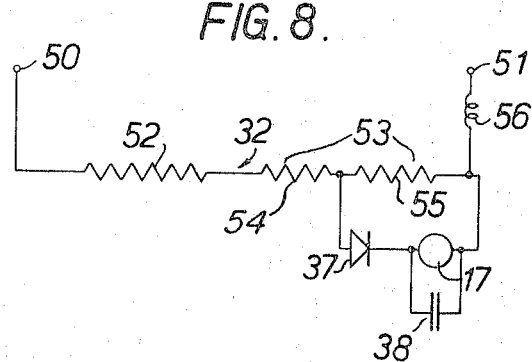

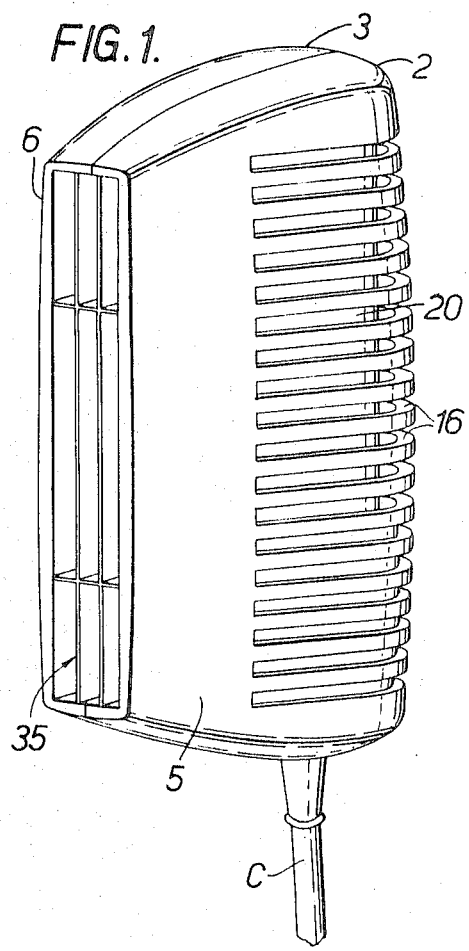
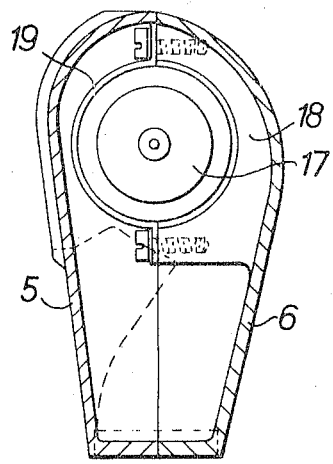
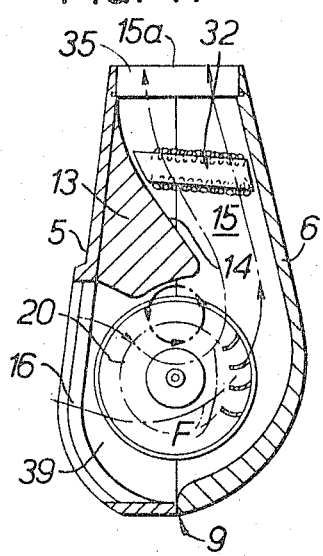
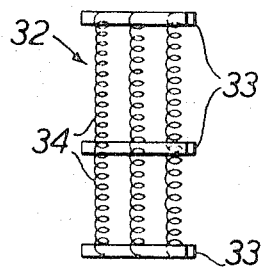

United States Patent Office 3,348,020
Patented Oct. 17, 1967

3,348,020
HAND-HELD ELECTRIC HAIR DRYER
Brian Cooper, Ascot, England, assignor to Firth Cleveland Limited, London, England
Filed Jan. 25, 1965, Ser. No. 427,577
Claims priority, application Great Britain,
Jan. 24, 1964, 3,262/64
8 Claims. (Cl. 219—370)

This invention relates to appliances comprising an electric heater element, an electric motor, and a fan driven thereby to cause a flow of air over the heater element. Examples of such appliances are domestic fan heaters and hair dryers.

It has been customary hitherto, in appliances for A.C. mains, to use an induction motor parallel-connected with the heater element across the full mains voltage, and to provide switching means so that the fan can be run without of the heater element if desired.

In contrast to the conventional arrangement just described, the invention provides an appliance comprising an electric heater element, an electric motor and a fan driven thereby to cause a flow of air over the heater element wherein the heater element is adapted for connection across A.C. mains voltage, the motor is a D.C. motor preferably of the permanent magnet type which is adapted to operate at a fraction only of the mains voltage, and the motor and a rectifier are together parallel-connected with a portion only of said element, so that the element acts as a potential divider for the motor.

The invention dispenses with the conventional switching means for operation of the fan independently of the heater element, and may dispense with a switch of any kind. By using a comparatively low voltage (say 6–24 volts) permanent magnet motor of suitable characteristics the fan may conveniently be driven at a high speed, and therefore may be smaller in size for a given throughput: the motor itself may be cheap and compact.

Preferably the fan is of the "tangential" type, that is, it is a cross-flow fan so constructed that in operation a vortex forms as explained in our British Patent 876,611: a "tangential" fan is remarkably efficient in the small size which, in general, the invention contemplates, and therefore calls for less driving power.

One embodiment of the invention will now be described by way of example with reference to the accompanying drawings in which:

FIGURE 1 is a perspective view of a hair dryer;
FIGURE 2 is a sectional plan view of the hair dryer;
FIGURE 3 is a transverse section of the hair dryer taken through the motor compartment;
FIGURE 4 is a transverse section of the hair dryer taken through the rotor;
FIGURE 5 is a front view of the heater element;
FIGURE 6 is a sectional view of the heater element;
FIGURE 7 is a view of the hair dryer looking towards the air outlet, and
FIGURE 8 is a diagram of the electrical circuit.

Referring to the drawings, the hair dryer there shown comprises a casing 1 formed by upper and lower plastics mouldings 2, 3 which fit together and are secured by screws 4. The casing 1 provides top and bottom walls 5, 6 interconnected by side walls 7, 8 and rounding into an end wall 9; the casing presents a cross-section like that of a truncated pear, and is approximately rectangular as seen in plan, the end wall 9 forming the big end of the pear and one long side of the rectangle.

A partition wall 10 extends across the casing parallel to and between the side walls 7, 8 and subdivides the casing interior into a smaller motor compartment 11 and a somewhat larger rotor compartment 12. A body 13 secured to the underside of the top wall 5 extends the length of the rotor compartment and provides a guide surface 14 opposite the bottom wall 6 which defines therewith a divergent duct 15 leading to an outlet 15a opposite the end wall 9. The top wall 6 is formed with air inlet slits 16 over the width of the rotor compartment and between the end wall 9 and the body 13.

A low voltage permanent magnet D.C. motor 17 is mounted within the motor compartment 11; the motor engages a seating 18 which is integral with the lower casing moulding 3 and is held thereon by a strap 19. A cylindrical bladed rotor 20 extends over the width of the rotor compartment 12; the rotor comprises a ring of forwardly curved blades 21 extending parallel to the rotor axis between supporting end discs 22, 23. The end disc 22 nearer the motor 17 is centrally apertured to receive a soft rubber bushing 24 which embraces the motor shaft 25 under tension: a groove 26 in the bushing receives the periphery of the aperture in the disc. The end disc 23 adjacent the side wall 8 carries a stub shaft 27 journalled in a sintered bearing 28 which is supported in a soft rubber block 29 received in a slot 29a in the side wall. The rotor 20 is thus mounted for rotation coaxially with the motor 17, with drive transmitted from the shaft 25 thereof through the rubber bushing 24: however the bushing 24 and block 29 are sufficiently flexible to accommodate minor misalignment between the axes of the motor and rotor, so as to avoid the need for exact alignment on assembly, with consequent expense. The end discs 22, 23 are received respectively in an aperture 30 in the partition wall 10, and in a recess 31 in the side wall 8, the inner surfaces of the end discs being flush with the corresponding surfaces of the walls 10 and 8.

A heater element 32 extends across the outlet duct 15 between the rotor 20 and the outlet 15a. This element 32 comprises a number of equally spaced insulator plates 33 oriented in planes transverse to the rotor axis and supporting coiled resistor wires 34 uniformly arranged over the cross-section of the duct. A grille 35 comprising vanes 36 arranged parallel to the direction of air flow is disposed in the outlet 15a to prevent manual contact with the heater element 32a.

The heater element 32 is tapped to provide an appropriate voltage to be applied through a rectifier 37 to the low voltage D.C. motor 17. A smoothing and reservoir condenser 38 is connected across the motor terminals. Both rectifier 37 and condenser 38 are located in the motor compartment 11. A switch may be provided.

In operation, if there is no switch, heating of the element 32 and rotation of the rotor occurs immediately on plugging into an A.C. mains supply; with a switch, heating and rotation occur only on switching on. The rotor 20, the body 13 and the opposed surface of the end wall 9 cooperate to induce a flow of air through the inlet slits 16 and into the inlet region 39 defined between the top wall 2 and the rotor 20, through the path of the rotating blades 21 of the rotor from the inlet region to the interior of the rotor and thence again through the path of the rotating blades to the outlet duct 15, through the heater element 32 and out of the outlet 15a as illustrated by the chain-lines F in FIGURE 4. The way in which this flow takes place is discussed in more detail in our British Patent 876,611 above referred to. The distribution of flow over the width of the outlet duct 15 is reasonably uniform (though it may be somewhat less at the side), whereby heat is removed more or less evenly from the uniformly distributed resistor wire coils of the heater element 32, and hot spots are thereby avoided.

The motor 17 is the heaviest part of the hair dryer and provides a concentration of weight towards the side wall 7 and end wall 9, so that the user's normal tendency is to put his hand around the rounded end wall 9 near the side wall 7, where the top wall 5 is imperforate. In this way the user supports the hair dryer near its centre of gravity while his hand leaves the air inlet slits 16 unobstructed.

As shown in FIG. 1, the cable C comes out of the casing 1 through the side wall 7 adjacent the end wall 9, and this, too, helps to make the user grasp the casing in the desired manner just mentioned. If a switch is provided this may be of the spring-loaded on-off type such that the hair dryer only operates when the switch is held on. The switch can be located on the casing so that it can only be operated when the user's hand is in a position where it clears the air inlet slits.

The top wall 5 can be ridged over the motor compartment 11 so that the user gets a better grip of the casing; top and bottom walls 5, 6 can be provided with depressions to locate the user's thumb and fingers.

In assembly of the hair dryer the motor 17 and rotor 20 (already connected to the rectifier 37 and condenser 38) are first connected by means of the bushing 24 and the bearing 28 and rubber block 29 are fitted on the stub shaft 27. The motor 17 is then engaged with its seating 18 in the lower casing moulding 3 as the rubber block 29 is inserted into the slot 29a, which is formed in the same moulding.

The heater element 32 is pre-assembled and the insulator plates 33 thereof are fitted into slots (not shown) in the lower casing moulding 3, while the wires 34 are stretched. The grille 35 is also slid into retaining grooves in this moulding. When the motor 17 is fixed to its seating 18 and the rectifier 37 and condenser 38 engaged in locating recesses (not shown) in the moulding 3, the upper moulding is applied to the lower moulding and the two mouldings secured together with the screws 4 so as to retain the rubber block 29, insulator plates 33 and grille 35 in their respective slots and grooves.

In one form of the construction illustrated the overall casing dimensions are 137 x 86 mm. in plan, with a rotor of 30 mm. diameter and 65 mm. length.

In a modified form of the hair dryer, the body 13 is moulded integrally with the upper casing part 2. Instead of using a strap 19 to hold the motor in place on a rigid seating, it may be rubber-mounted in the lower moulding and held in place thereon on assembly of the upper moulding. The rectifier 37 is shown as a half-wave rectifier, but can instead be a full-wave rectifier. Particularly with a full wave rectifier the smoothing condenser 38 may be dispensed with.

FIGURE 8 shows a circuit adapted for a 220 volts A.C. mains supply, applied to the terminals 50, 51. The heater element 32 is divided into two parts 52, 53 and the latter is also divided into two parts 54, 55. The rectifier 37 and motor 17 in series therewith are connected in parallel with the heater element part 55. 56 is a suppressor choke to minimize radio interference.

For a hair dryer of the dimensions above given the motor 17 may be a permanent magnet motor of some 5 watts 12 volts operating at 6000–7000 r.p.m.

The circuit can be connected for 110 volts A.C. by putting the element parts 52, 53 in parallel between the terminals 50, 51. If desired an alternative tapping and switch can be provided to allow for two motor speeds.

From the foregoing it will be appreciated that important aspects of the invention reside in the shape and arrangement of parts of the hair dryer, and that in these aspects the invention is not necessarily dependent on the use of a D.C. motor and rectifier connected across a part of the heater element. Thus regarded, the invention provides a hand-held hair dryer comprising a casing having an inlet and an outlet and containing an electric heater element, an undivided cylindrical bladed rotor mounted for rotation about its axis, and an electric motor driving the rotor, the rotor in operation cooperating with adjacent guide surfaces to induce a flow of air from the inlet through the path of the rotating blades of the rotor to the interior thereof and thence again through the path of the rotating blades to the outlet past the heater element, *wherein* the casing is generally rectangular in plan with the rotor and motor disposed coaxially along one long side of the rectangle and the outlet is on the other long side of the rectangle directly opposite the rotor, and the casing is without a handle and of a size and shape such as to be grasped readily in the hand of a user. The invention may include also further features, as above described by way of example.

The expression "generally rectangular" is intended to include a configuration where the casing side walls converge somewhat, and also an arrangement where opposite the motor the motor compartment is chamfered off.

I claim:

1. A hand-held hair dryer for use with alternating current line voltage of nominally at least 110 volts, comprising a casing of a size to be held in the palm of the hand of the user, said casing having an inlet and an outlet, an electric heater element mounted in said casing and connected to be energized by line voltage, a fan to cause a flow of air between inlet and outlet over said heater element, permanent magnet, direct current motor of minimum nominal speed in the order of 6,000 r.p.m. and directly driving said fan and operating at a small fraction only of the line voltage and in the order of 6–24 volts, and a rectifier connected with said motor and across a portion of said heating element, said heating element acting as a voltage dropper for the motor.

2. A hair dryer according to claim 1 wherein said D–C motor has a rated voltage of from 6 to 24 volts.

3. A hair dryer according to claim 1 wherein D–C motor is a 12 volt motor.

4. A hand-held hair dryer for use with alternating current line voltage of nominally at least 110 volts, comprising a casing of generally rectangular configuration and of a size to be held in the palm of the hand of a user and an inlet and an outlet, an electric heating element mounted in said casing and connected to be energized by said line voltage, a one-piece, cylindrical, bladed rotor mounted in said casing for rotation about its axis, a permanent magnet, direct current motor having a nominal speed in the order of at least 6,000 r.p.m. and directly driving said fan and operating voltage in the range from 6–24 volts, a rectifier connected with said motor and across a portion of said heating element, said heating element acting as a voltage dropper for the motor, and guide means cooperating with said rotor to induce a flow of air from the inlet, through the path of the rotating blades of the rotor to the interior thereof and thence again through the path of the rotating blades and through the heating element to the outlet.

5. A hand-held hair dryer according to claim 4 wherein the casing has overall dimensions, in plan view, of about 137 x 86 mm., and the nominal speed of the motor is in the range of from 6,000 to 7,000 r.p.m.

6. A hand-held hair dryer for use with alternating current line voltage of nominally at least 110 volts, comprising a casing of a size to be held in the palm of the hand of a user, said casing having an inlet and an outlet, an electric heating element mounted in said casing and connected to be energized by said line voltage, a one-piece, cylindrical, bladed rotor mounted in said casing for rotation about its axis, a high speed, permanent magnet, direct current motor having a nominal speed in the order of at least 6,000 r.p.m. and directly driving said fan, a rectifier series connected with said motor and across a portion of said heating element to provide a voltage of from 6–24 volts to said motor, said heating element acting as a voltage dropper for the motor for the difference from the line voltage, and guide means cooperating with said rotor to induce a flow of air from the inlet, through the path of the rotating blades of the rotor to the interior thereof and thence again through the path of the rotating blades and through the heating element to the outlet.

7. A hair dryer according to claim 6 wherein said motor is a 12 volt motor and said voltage provided to said motor is 12 volts.

8. A hand-held hair dryer according to claim 6, wherein said casing is of generally rectangular configuration and of a size, in plan view, of about 137 x 86 mm., and the nominal motor speed is in the range of from 6,000 to 7,000 r.p.m.

References Cited

UNITED STATES PATENTS

| | | | |
|---|---|---|---|
| 2,717,969 | 9/1955 | Buchhold et al. | 310—154 X |
| 3,147,368 | 9/1964 | Walker | 219—370 |
| 3,219,261 | 11/1965 | Laing | 219—374 X |
| 3,260,442 | 7/1966 | Laing | 219—370 X |
| 3,264,450 | 8/1966 | Wallace | 219—364 X |
| 3,284,611 | 11/1966 | Laing | 219—370 |

ANTHONY BARTIS, *Primary Examiner.*